(12) United States Patent
Scanferla et al.

(10) Patent No.: US 12,137,352 B2
(45) Date of Patent: *Nov. 5, 2024

(54) METHODS AND SYSTEMS FOR DATA-DRIVEN ROLL-OUT PLANNING OPTIMIZATION

(71) Applicant: Swisscom AG, Bern (CH)

(72) Inventors: Damiano Scanferla, Bern (CH); Pavle Belanovic, Lausanne (CH)

(73) Assignee: Swisscom AG (CH)

( * ) Notice: Subject to any disclaimer, the term of this patent is extended or adjusted under 35 U.S.C. 154(b) by 0 days.

This patent is subject to a terminal disclaimer.

(21) Appl. No.: 18/228,107

(22) Filed: Jul. 31, 2023

(65) Prior Publication Data

US 2024/0031820 A1    Jan. 25, 2024

Related U.S. Application Data

(63) Continuation of application No. 17/977,070, filed on Oct. 31, 2022, now Pat. No. 11,716,636, which is a continuation of application No. 17/141,559, filed on Jan. 5, 2021, now Pat. No. 11,533,635, which is a continuation of application No. 16/866,789, filed on May 5, 2020, now Pat. No. 10,887,775, which is a
(Continued)

(30) Foreign Application Priority Data

Sep. 21, 2016    (EP) .................................... 16189931

(51) Int. Cl.
*H04W 16/18* (2009.01)
*H04W 16/22* (2009.01)
*H04W 24/02* (2009.01)

(52) U.S. Cl.
CPC ........... *H04W 16/18* (2013.01); *H04W 16/22* (2013.01); *H04W 24/02* (2013.01)

(58) Field of Classification Search
CPC ...... H04W 16/18; H04W 16/22; H04W 24/02
See application file for complete search history.

(56) References Cited

U.S. PATENT DOCUMENTS 11,716,636 B2 *   8/2023   Scanferla .............. H04W 16/18
                                                        455/446

OTHER PUBLICATIONS

"Performance Analysis of LTE-Advanced Networks in Different Spectrum Bands", Fourat Haider et al, Wireless Advanced (WIAD), 2011, IEEE, Jun. 20, 2011 (Jun. 20, 2011), pp. 230-234, XP031928210.
(Continued)

*Primary Examiner* — Myron Wyche
(74) *Attorney, Agent, or Firm* — McAndrews, Held & Malloy, Ltd.

(57) ABSTRACT

Methods and systems are provided for data-driven network roll-out planning. Network data associated with a network that includes a plurality of cells may be analyzed, with the analyzing including assessing throughput of users on a sector-by-sector basis in the network. Prioritization information on per-sector basis for the network may be generated, and based on the prioritization information, a network roll-out plan for use in the network may be optimized. The prioritization information may be generated based on a valuation scheme and/or a congestion level. Cost optimization information, for use in the optimizing of the network roll-out plan, may be generated. One or more actions may be recommended based on the network data.

25 Claims, 3 Drawing Sheets

Related U.S. Application Data continuation of application No. 16/416,771, filed on May 20, 2019, now Pat. No. 10,645,594, which is a continuation of application No. 15/702,279, filed on Sep. 12, 2017, now Pat. No. 10,299,141.

(56) References Cited

OTHER PUBLICATIONS

"Management Architecture for Aggregation of Heterogeneous Systems and Spectrum Bands", Holland Oliver et al., IEEE Communications Magazine, IEEE Service Center, Piscataway, US, vo 1. 54, No. 9, Sep. 1, 2016 (Sep. 1, 2016), pp. 112-118, XP011623176.
"Performance Evaluation Methodology for Carrier Aggregation", CMCC et al., 3GPP Draft; R4-091233 CA Methodology, 3rd Generation Partnership Project (3GPP), Mobile Competence Centre; 650, Route Des Lucioles ; F-06921 Sophia-Antipolis Cedex; France, No. Seoul, Korea; Mar. 30, 2009, Mar. 30, 2009 (Mar. 30, 2009), XP050342010.

* cited by examiner

METHODS AND SYSTEMS FOR DATA-DRIVEN ROLL-OUT PLANNING OPTIMIZATION

CLAIM OF PRIORITY

This patent application is a continuation of U.S. patent application Ser. No. 17/977,070, filed on Oct. 31, 2022, which is a continuation of U.S. patent application Ser. No. 17/141,559, filed on Jan. 5, 2021, which is a continuation of U.S. patent application Ser. No. 16/866,789, filed on May 5, 2020, which is a continuation of U.S. patent application Ser. No. 16/416,771, filed on May 20, 2019, which is a continuation of U.S. patent application Ser. No. 15/702,279, filed on Sep. 12, 2017, which claims the filing date benefit of and right of priority to European (EP) Patent Application Serial No. 16189931.5, filed Sep. 21, 2016. Each of the above applications is hereby incorporated herein by reference in its entirety.

TECHNICAL FIELD

The present disclosure relates to networking solutions. In particular, various implementations in accordance with the present disclosure relate to the field of roll-out planning, particularly for mobile telecom carriers such as cellular network operators.

BACKGROUND

Conventional methods and systems for roll-out planning can be costly, cumbersome and inefficient. Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY

Systems and/or methods are provided for data-driven roll-out planning optimization, substantially as shown in and/or described in connection with at least one of the figures, as set forth more completely in the claims.

These and other advantages, aspects and novel features of the present disclosure, as well as details of an illustrated implementation thereof, will be more fully understood from the following description and drawings.

BRIEF DESCRIPTION OF THE DRAWINGS

Various features and advantages of the disclosure will become apparent from the following description of non-limiting exemplary implementations, with reference to the appended drawings, in which.

DETAILED DESCRIPTION

Figure 1:
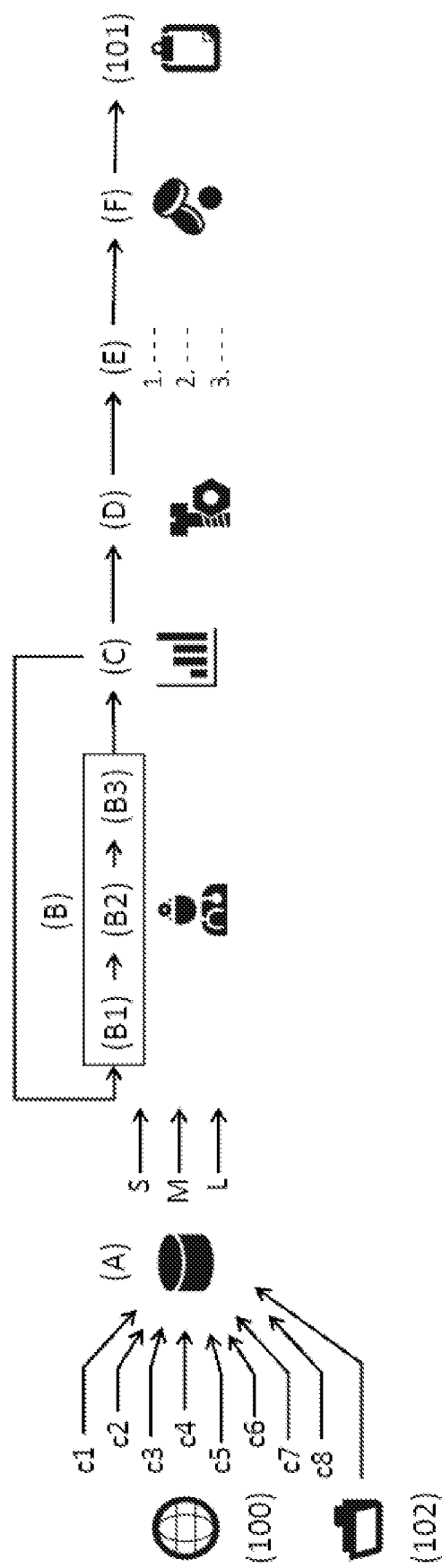
FIG. 1 illustrates a sequence of steps of the proposed scheme for optimized roll-out planning according to an example implementation of the present disclosure.

As utilized herein, "and/or" means any one or more of the items in the list joined by "and/or". As an example, "x and/or y" means any element of the three-element set {(x), (y), (x, y)}. In other words, "x and/or y" means "one or both of x and y." As another example, "x, y, and/or z" means any element of the seven-element set {(x), (y), (z), (x, y), (x, z), (y, z), (x, y, z)}. In other words, "x, y and/or z" means "one or more of x, y, and z." As utilized herein, the term "exemplary" means serving as a non-limiting example, instance, or illustration. As utilized herein, the terms "for example" and "e.g." set off lists of one or more non-limiting examples, instances, or illustrations.

As utilized herein the terms "circuits" and "circuitry" refer to physical electronic components (e.g., hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

Certain example implementations in accordance with the present disclosure may be found in systems and methods for data-driven roll-out planning optimization, as described below in more detail with reference to the attached figures. In this regard, bandwidth-consuming applications, such as streaming services or data downloads, are increasingly being used, including on the go and while in public places or when using public transportation means. Further, remote access solutions like VPNs (virtual private networks) are also widely used, for work purposes, such as by people who are travelling, are commuting to or from work, and/or are otherwise mobile, and who may utilize such solutions to perform bandwidth-consuming tasks—e.g., download at any possible time a large amount of data, including attachments to e-mails of sizes reaching several Megabytes each. As a result, there has been steady increase in data traffic over mobile networks, and both an extended coverage to allow for ubiquitous computing, as well as an improved network capacity to provide permanent reliable data communication, are required.

For nomadic use, WLAN (wireless local area network) technologies are becoming widespread, being used to provide high-speed Internet access (e.g., via "Hot-Spot" areas), such as through Wi-Fi (IEEE 802.11 based) connections. Thus, most portable electronic devices (e.g., smartphones, tablets, and laptops) are now fitted with a wireless interface based on such technologies for Internet connectivity. Nevertheless, various limitations exist with the use of such technologies. For example, the reach of the Hot-Spot areas, where such types of connections may be available, is typically limited in range (e.g., to about a hundred meters at most, and in practice, reduced to a size of about 100 square meters indoors), due to the attenuation caused by, for example, delimiting walls and floors. Therefore, their use is restricted typically to certain settings (e.g., hotels, restaurants, stores etc.) Moreover, no handover is foreseen between neighboring areas, hence leaving no room for mobility support.

In contrast, large-scale mobile cellular networks, which were primarily intended for synchronous voice channel establishment, do provide such mobility support. However, the mobile cellular networks originally deployed (e.g., 2G technologies) may have not been suitable for or capable of supporting pervasive high-speed data connections. But, with newer 3G and 4G cellular technologies, such as UMTS (Universal Mobile Telecommunications System) and LTE (Long-Term Evolution), which offer far better bandwidth capabilities, both network coverage and capacity may be improved. As a result, the paradigm of such mobile networks dramatically shifted from mere synchronous voice traffic support to enhanced coverage and further bandwidth provisioning for data traffic as well, as a complement to WLAN networks when these types of networks are available, and as an alternative thereto otherwise. Nonetheless, with the continuous increase in data traffic, the capacity of these mobile networks may also be challenged.

In order to keep up with the pace of growing demand from customers, mobile network operators may continuously roll out new network equipment, to ensure that the consumers' expectations are met. When doing so, the mobile network operators typically want to increase network capacity at the lowest possible cost. However, the maximization of network capacity at the lowest possible cost is a very difficult exercise, since the most relevant incremental changes typically made (e.g., adding a new base station), to increase coverage and capacity, simultaneously have significant budgetary considerations, since the required new network elements and their related construction costs are the biggest capital expenditures. On the other hand, gathered practical experience from technicians to carry out more minor adjustments can prove to be little effective.

Accordingly, data-driven models for roll-out planning depending on current traffic data have been proposed, involving the leveraging of available network counter data and taking severe budget-constraint considerations into account. To that end, predictive algorithms may be used. In this regard, a predictive algorithm may be used to determine how users are likely to be served for data traffic on a specific cell (e.g., over a particular carrier frequency), such as depending on current numbers of users connected to that cell. Such algorithm may first determine the amount of available physical resource blocks for such traffic, by excluding voice traffic, and then use a probability mass function modelling to assess what the achievable data throughput should be for users in the cell. Then, by computing a cumulative distribution function, and setting a lower throughput boundary for worst-served users, it may be ascertained whether these users are likely to be served with good quality according to the carrier's standards, and appropriate re-dimensioning measures are otherwise taken.

A predictive algorithm may become even more useful if it is capable of carrier aggregation (CA), a technique whose use is widespread with new generation wireless technologies, and available among others on new 4G standards like LTE. Therefore, technical recommendations derived from such an algorithm for a sector comprising multiple cells may be improved, or at least will help to fully optimize any roll-out planning for upgrading the mobile network, because the proposed cell-based modelling may be more realistic for assessing how a new user would be actually served when such user would like to connect to the mobile network at a given physical location. Therefore, there may be a need (e.g., by mobile network carriers) for roll-out planning that is also capable of considering these developments, in particular carrier aggregation, for use by mobile network carriers.

Accordingly, various example implementations in accordance with the present disclosure provide methods and systems for optimized roll-out planning for mobile carriers supporting carrier aggregation and yielding data traffic predictions with improved accuracy. Further, optimized roll-out planning in accordance with the present disclosure may support a wider range of weighting parameters in order to better refine technical recommendations. In accordance with the present disclosure, an optimized network roll-out plan for a mobile network may be provided, comprising sectors fitted with multiple cells, with each cell working over its own respective carrier frequency. In this regard, in a mobile cellular network, a physical location divided into one or more sectors is usually referred to as a site. For example, a site may typically be divided into 3 sectors, each spanning over 120°, in order to provide isotropic service capabilities. Each sector is then defined as a physical area around a site, which is covered by one or more cells (e.g., network elements comprising suitable circuitry for serving a sector using a particular carrier and technology through one or more antenna elements).

The optimized network roll-out plan may be provided by gathering data from several network counters, and then analyzing the gathered data, to determine available network resources for data traffic. The data analysis (step) may further comprise a congestion detection (substep) using a probability mass function (PMF) and a cumulative distribution function (CDF) modelling in order to assess what the achievable data throughput for a user present in the sector could be. The congestion detection substep may involve at least one carrier aggregation (CA) scenario between two or more cells in the sector, with congestion situation being detected by comparing a predefined percentile of an aggregated CDF curve, weighted based on probabilities of possible cell connection configurations, with a predefined minimal throughput level.

Thus, example implementations in accordance with present disclosure may be advantageous in comparison to existing solutions because they include a broader range of modelling scenarios, such as for assessing how users present at a physical location are served, on a sector-by-sector basis, through an aggregated metric. As a result, data throughput for users present at a physical location may be defined with better precision, as the capacity adjustments are forecast in a coordinated way, while the fine tuning of each cell is still performed individually.

In an example implementation, pain points may be identified on a cell-by-cell basis, such as depending on measured load-balancing features. This may make it possible to target improvements in a modular way for each sector when carrying out the roll-out planning.

In an example implementation, pain points identified on the network based on load-balancing features between all available cells may be labelled as coverage or capacity issue. This may make it possible to prune all available technical solutions to only a relevant subset thereof and hence to significantly ease the overall processing when carrying out the roll-out planning.

In an example implementation, classes of services corresponding to user profiles may be defined based on subscription types, and an achievable throughput is computed for each user profile on each sector. Thus, the network dimensioning may, as a result, perfectly match the traffic constraints according to the patterns derived on a profile-by-profile basis.

In an example implementation, optimized roll-out planning may comprise performing a prioritization assessment (or step), such as depending on a sector value set by the mobile carrier as well as on the pain point severity. This prioritization may further help refine and optimize the roll-out planning.

In an example implementation, optimized roll-out planning further involves a cost estimation step, including both capital and operational expenditures. This cost estimation step can be performed after the prioritization step in order to validate the prescribed recommendations in view of predefined budget constraints, so that the overall total cost of ownership of the network is minimized in parallel.

In an example implementation, optimized roll-out planning may comprise use of a traffic growth prediction scheme, such as to fine-tune timelines for roll-out. When combined with a class-of-service differentiation scheme (e.g., depending on new subscription expectations by type), the timelines for roll-out then may also be adjusted depending on the distribution of the overall traffic growth with respect to user profile. Accordingly, the optimized roll-out planning efficiently uses counters of a mobile network in order to make recommendations on where, when, and which technology should be used in order to maximize the capacity of the monitored mobile network at the lowest possible cost.

Further advantageous features aimed at optimizing the roll-out of a mobile network are discussed below, with reference to the drawings illustrating example implementations for the present disclosure. It will be understood that the advantageous features pertaining to each of these example implementations can be taken alone or in combination for implementing the present disclosure.

FIG. 1 illustrates a sequence of steps of the proposed scheme for optimized roll-out planning according to an example implementation for the present disclosure. Shown in FIG. 1 is an example sequence of steps (A) to (F) for implementing optimized roll-out planning scheme, yielding an improved roll-out plan 101 for a mobile network 100. In this regard, the mobile network 100 comprises a cellular mobile network 100.

In this regard, the various steps described hereinafter may be performed in a system (not shown) that comprises suitable circuitry for implementing various aspects of the present disclosure. Such circuitry may comprise, e.g., general or dedicated processing circuitry, storage circuitry, communication-related circuitry, etc. In some instance, such system may be implemented as a single physical apparatus, which may reside centrally in a network utilizing the described scheme, and be operated by the network provider. In other instances, however, the various steps and/or related operations may be performed by various different components and/or subsystems of the network. In this regard, the different components and/or subsystems may interact with each other, and data or control services may be performed or handled either in a centralized way, or may have their functionalities distributed among the different subsystems, for example leveraging the cooperation between the elements of each subsystem.

The roll-out planning optimization scheme described hereinafter may be for a site implemented based on LTE (Long Term Evolution; a 4G mobile standard) technology and two cells. The two cells may be configured, for example, at respective carrier frequencies of 800 MHz and 1800 MHz, and having a bandwidth of 10 MHz and respectively, centered over their carrier center frequency. Nonetheless, it should be understood that this specific use scenario and all the features pertaining to it, particularly with respect to the use of roll-out planning optimization scheme described herein, are given by way of example only, and should not be construed in a limiting manner. Rather, it should be appreciated that many of the details and features described herein (e.g., the formulas used by the proposed algorithm) may be extended to other use scenarios—e.g., sectors comprising more than two cells.

For example, the roll-out planning optimization described herein may similarly be extended to an additional (third) cell working at a carrier frequency of 2100 MHz, and could also be further extended to a fourth cell working at a carrier frequency of 2600 MHz, and so on, whereby carrier aggregation may then be performed on any of the available carrier frequencies, irrespective of the bandwidth available on each carrier frequency. Further, the center frequencies, which are given by way of example for LTE based implementation, are purely exemplary, and the proposed algorithm would similarly work with any other center frequencies.

In the example use scenario shown in FIG. 1, each sector of the mobile network 100 may periodically send a set of counter data to its Operation Support System (OSS). An example embodiment for optimized roll-out planning uses a subset of these counters supplying input parameters in a first data gathering step (A), and then processes them in a subsequent data analysis step (B) in order to assess what is the achievable throughput of users, on a sector-by-sector basis. In a first congestion detection substep (B1), it determines whether enough throughput would be available for worst-served users, according to the carrier's quality standards; then, in a further pain point identification substep (B2), pinpoints the cell that is concerned in the first place, whenever possible, and eventually, in a third so-called pain point classification substep (B3), the kind of problem occurring for this identified cell—e.g., whether it pertains primarily to capacity or coverage, is auxiliary set. When such a labelling as a coverage or a capacity issue is possible, the subsequent action recommendation step (D) is greatly simplified because non-relevant technical options are already pruned as an output of this analysis step (B).

For example, possible actions that may be taken when congestion is detected may comprise one or more of: 1) installing a new outdoor macro site in the area; 2) adding a new cell to the given sector; 3) expanding the bandwidth on a given cell; 4) adding antenna elements; 5) installing a new indoor small cell in the area; 6) installing a new outdoor small cell in the area; and 7) performing load-balancing adjustment between existing cells in the given sector.

Among all of these proposed technical options, some are essentially directed to coverage (e.g., the installation of a new indoor small cell) while others are essentially directed to capacity (e.g., adding a new cell on an existing sector), and therefore solutions solving one type of problem (e.g., labelled as coverage or capacity) can simply be ignored when it is sought to solve an issue of another type. Thus, the subsequent prioritization step (E), depending on a sector value (e.g., train stations, where a lot of traffic is usually generated, and other similar critical places are very important for the reputation of mobile carriers in terms of quality of service) and/or the severity of the problem, depending on the level of scarcity of resources that has been estimated, may be also simplified.

The optimal roll-out plan 101 may be then determined by taking into account budget constraints in terms of capital expenditures (also known as CAPEX, involving the acquisition of new network material, such as antennas, etc.) and operational expenditures (also known as OPEX, mainly directed to manpower and maintenance costs) in a last so-called cost estimation step (F). The budget is then divided up, starting from the top of the list where the most critical and urgent actions are to be found, downwards, until the budget is exhausted.

Another aspect that may also be considered for optimizing the roll-out plan (101) is the setting and adjustment of deadlines. In this regard, data provided by the network counters may typically correspond to present conditions, and therefore may not provide any historical perspective on the evolution of traffic, or any extrapolation scheme in order to forecast how the network traffic will evolve on the short and mid-term. Thus, timelines may be addressed in the growth prediction step (C), whose function is to extrapolate the network data over future period(s) of time (e.g., over the next 6, 12 and 24 months). The data analysis step (B), and all of its substeps (B1, B2, B3), may then be reiterated (re-performed), which allows deadlines to be set for the roll-out with a fine granularity, along with the best possible technical options at each stage. This (the reiteration of the data analysis step (B)) is illustrated in FIG. 1 as a feedback loop from the growth prediction step (C) back to the data analysis step (B). Examples pertaining to the growth prediction scheme modelling are detailed below, in order to further optimize the roll-out planning.

More details are now provided for the various steps in the sequence. In this regard, reference is made hereinafter resource elements (REs), which correspond to a defined amount of time-frequency resources, as well as to physical resource blocks (PRBs), which correspond to a minimum allocable resource to a user, composed of a set of REs, and to channel quality indicators (CQIs), which indicate the radio channel quality between the user and a given cell, by indicating the number of bits that can be sent per RE. The transmission time interval (TTI), set to 1 ms in LTE, corresponds to the minimum scheduling time for one user. The formulas defined below are meant to implement the data analysis step (B) according to an example implementation for the roll-out planning process, where the carrier aggregation (CA) technique, in which the user can combine the resources of two or more cells, is now taken into account for throughput estimation.

In the example use scenario shown in FIG. 1, eight different network counters are used in order to provide data that will serve as input parameters for the algorithm: a first counter c1, counting the daily number of total available PRBs per TTI in a cell; a second counter c2, counting the daily number of total users in that cell; a third counter c3, counting the daily number of active users in the cell; a fourth counter c4, counting the daily number of used PRBs for VoLTE, e.g., voice over LTE; a fifth counter c5, counting average daily distribution of CQI; a sixth counter c6, counting the daily number of users that support CA and a certain number of secondary cells; a seventh counter c7, counting the daily number of users that are configured with a certain number of secondary cells among the ones supporting CA; and an eight counter c8, counting the daily number of TT's in which voice or data were required to be sent.

The algorithm used during the data analysis step, for roll-out planning in accordance with the present disclosure, may use as inputs the following parameters:

$RE_{PRB}$, which is the number of REs in one PRB. This parameter is set by the technology that is used;

Total PRBs per TTI, which is the total number of available PRBs in a cell for one TTI, which is simply a function of the cell's bandwidth (e.g., 50 PRBs/TTI for 10 MHz, 100PRBs/TTI for 20 MHz). This value is returned by the first counter c1;

VoLTE PRBs, which is the number of PRBs in a cell that are used for VoLTE traffic. This input value is returned by the fourth counter c4, e.g., with the help of QCIs (Quality of Service (QoS) class identifiers). In this regard, usually voice traffic is heavily prioritized on a network since it is very sensitive to delay and jitter, and therefore assigned the highest possible priority (e.g., QCI=1). As a result, the overall traffic tagged with this class of service is measured, and more generally speaking, all possible classes of services pertaining to voice traffic (e.g., typically QCI 1 and 5);

Total UEs, which is the total number of users in a cell. This input value is returned by the second counter c2;

Active TTIs, which is the total number of TTIs in which data or voice was actually sent during the observation period—typically daily—hence, disregarding the ones that ended up unused. This input value is returned by the eight counter c8;

Active UEs per TTI, which is the average number of active users in a cell for one TTI, "active" meaning that data is in the process of being sent or is waiting to be sent to such users. This input value is obtained by dividing the value returned by the third counter c3 by the one returned by eight counter c8;

CA non-capable UEs, which is the number of users in a cell that do not support CA and can therefore only be connected to one cell at a time;

CA capable UEs, which is the number of users in a cell that do support CA, with at least two cells as in the present example, but possibly with more cells (3, 4, ... ). This input value is returned by the sixth counter c6;

CA capable and configured UEs, which is a subset of the number of users in a cell that support CA. It represents the numbers of users in the cell that are not only capable, but also configured, to use CA. This input value is returned by the seventh counter c7;

CA capable not configured UEs, which is this input value is yielded by both previous counters c6 and c7 as the number of users in a cell that are actually CA capable, but are not configured to use CA;

$Thr_{RE}$, which is the achievable throughput in bits for one RE, as a function of the CQI values (e.g., 16 for LTE), which is $Thr_{RE}$ (q), $\forall q \in$ possible CQIs; and Probability Mass Function (PMF) of the CQIs in a cell ($PMF_{CQI}$). In this regard, $PMF_{CQI}(q)=Pr(CQI=q)$, $\forall q \in$ possible CQIs. These input values are derived from the available data provided by the fifth counter c5.

In order to assess how users of a given cell $C_i$ are served, first the number of available PRBs for data per TTI in that cell is calculated, by excluding the voice traffic, as explained in the formula (1) below:

$$\text{Available data } PRBs \text{ per } TTI(C_i) = \text{Total } PRBs \text{ per } TTI(C_i) - \frac{VoLTE\ PRBs(C_i)}{Active\ TTIs} \quad (1)$$

Then, the number of PRBs per TTI in the cell $C_i$ that a user currently present in cell $C_i$ can expect to use for data is computed as in the formula (2) below:

Available data PRBs per TTI for a user($C_i$) = $\dfrac{\text{Available data } PRBs \text{ per } TTI \ (C_i)}{\text{Active } UEs \text{ per } TTI \ (C_i)}$ (2)

And finally, the PMF of the achievable throughput for users present in the sector using cell C=$C_i$ may be derived, based on the value yielded by the formula (2), using the formula (3) below.

$$\text{PMF}_{Thr,C_i}(t) = Pr(Thr=t) = Pr(CQI=q) \qquad (3)$$

where:

$t \in \{t(q,C_i), \forall q \in \text{ possible CQIs}\}$ $t(q,C_i) = (1-Rt) * Thr_{RE}(q) * RE_{PRB} *$ Available data PRBs per TTI for a user($C_i$)*Number of TTIs where Rt corresponds to a correction factor due to the fact that not all bits sent over the air are received correctly. Thus Rt corresponds to the block error rate (BLER) rate and is usually estimated around 10%.

In order to provide a more realistic estimation of the average throughput achieved by users present on a site whose sectors are fitted with multiple cells covering the same areas with different carriers, and not only a single cell $C_i$, example implementations according to the present disclosure incorporate carrier aggregation (CA) in a probabilistic modelling. For example, In the case of a sector with 2 cells $C_i$ and $C_j$, working respectively on a first carrier frequency L1 and a second carrier frequency L2, there are three possible cell connection configurations for a user: (i) the user is connected to cell $C_i$ only; (ii) the user is connected to cell $C_j$ only; and (iii) the user is connected to both $C_i$ and $C_j$, using CA.

The probability of a user in the sector being connected to cell $C_i$ only is given by the formula (4) below, corresponding to configuration scenario (i)

$$Pr(Conf = C_i) = \dfrac{CA \text{ non capable } UEs(C_i) + CA \text{ capable not configured } UEs(C_i)}{\text{Total } UEs(C_i)} \qquad (4)$$

The formula (4) would apply similarly when the user is connected to cell $C_j$, corresponding to configuration scenario (ii).

As for as configuration scenario (iii), the probability of a user in the sector being connected to $C_i$+$C_j$ is given by the formula (5) below:

$$Pr(Conf = C_i + C_j) = \dfrac{CA \text{ capable and configured } UEs(C_i) + CA \text{ capable and configured } UEs(C_j)}{(\text{Total } UEs(C_i) + \text{Total } UEs(C_j))} \qquad (5)$$

Further, the PMF of the achievable throughput for users in the sector using both cells $C_i$, $C_j$ is given by the formula (6) below:

$$\text{PMF}_{Thr,C_i+C_j}(t) = \Sigma_{(t_i,t_j) \in \{(t_i,t_j) | t_i+t_j=t\}} \text{PMF}_{Thr,C_i}(t_i) * \text{PMF}_{Thr,C_j}(t_j) \qquad (6)$$

where $t_i \in \{t(q,C_i), \forall q \in \text{ possible CQIs}\}$ $t_j \in \{t(q,C_j), \forall q \in \text{ possible CQIs}\}$ The PMF of the achieved throughput for users in the sector corresponds to an aggregation of all the 3 possible configurations, hence providing a more accurate and realistic modelling according to the formula (7) below, which is actually a modified version of the formula (3) mentioned here above, now taking CA into account and the probability of each scenario yielded by previous the formulas (4) and (5) as weights w.

$$\text{PMF}_{Thr,aggregated}(t) = \Sigma_{C \in \{C_i, C_j, C_i+C_j\}} Pr(Conf=C) * \text{PMF}_{Thr,C}(t) \qquad (7)$$

where:

$t \in \{t_i+t_j\}$ $t_i \in \{t(q,C_i), \forall q \in \text{ possible CQIs}\}$ $t_j \in \{t(q, C_j), \forall q \in \text{ possible CQIs}\}$ The throughput for some of the worst-served users in the sector is then defined as a low percentile Pe of the PMF of the achievable throughput of all users in the sector, and recommendations are made accordingly if the values obtained are situated below a predefined minimal throughput level, Tm, determining whether congestion occurs or not, as explained in more details below with respect to FIG. 2a.

In the example implementation currently described, this low percentile Pe may be set to, e.g., 10% (or 0.1) as shown in the formula (9) below.

$$Thr_{worst\_UEs} = x | \Sigma_{t=0}^{x} \text{PMF}_{Thr,aggregated}(t) = 0.1 \qquad (9)$$

The Cumulative Distribution Function (CDF) of any of the PMF throughputs defined in the formula (9) above is defined by the formula (10) below:

$$\text{CDF}_{Thr}(x) = \Sigma_{t=0}^{x} \text{PMF}_{Thr}(t) \qquad 10)$$

Thus, the formula (9) can be reformulated as the formula (11) below:

$$Thr_{worst\_UEs} = x | \text{CDF}_{Thr,aggregated}(x) = 0.1 \qquad (11)$$

Figure 2A:
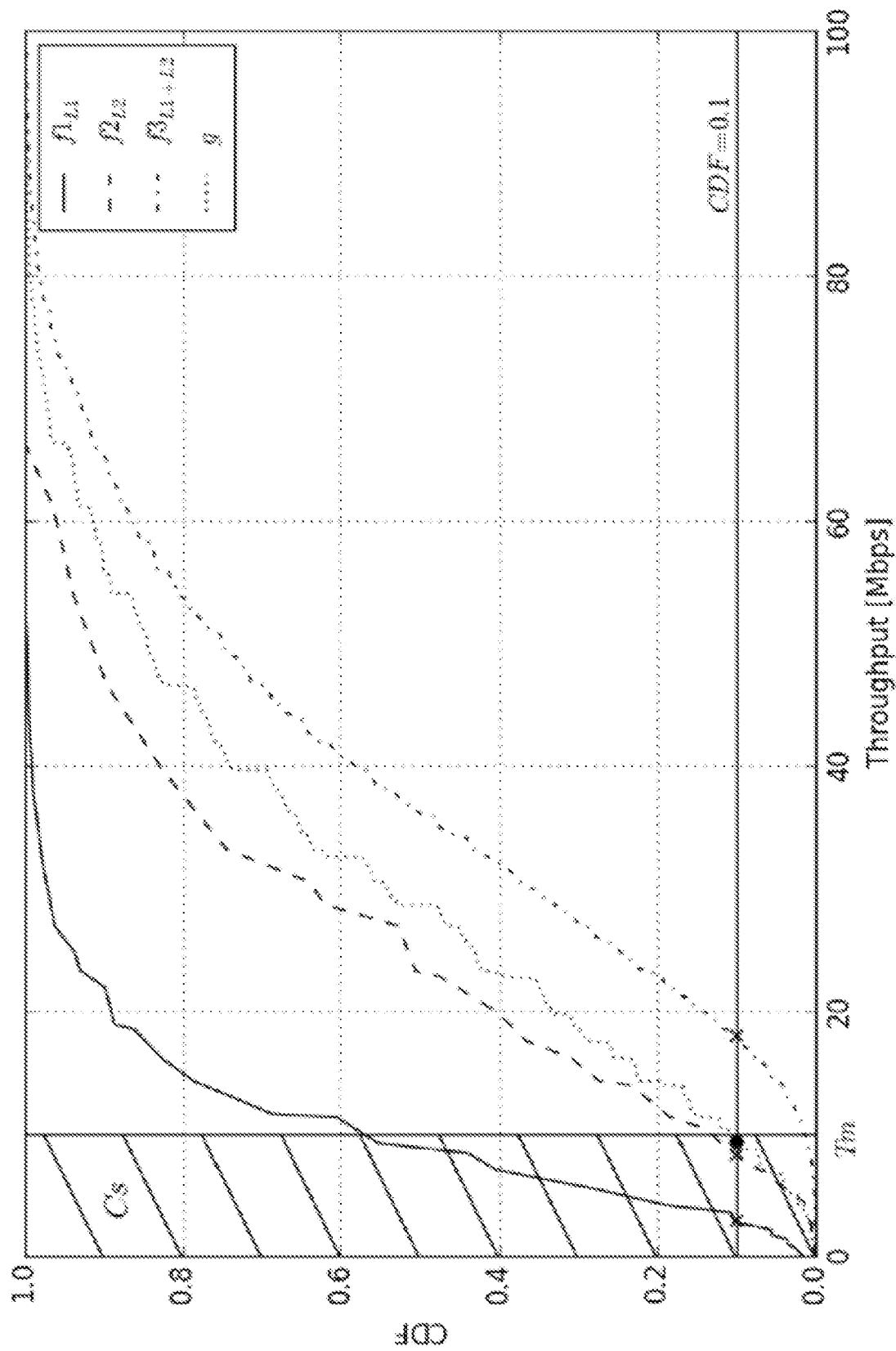
FIG. 2a illustrates cumulative distribution function curves derived from network counters for each cell and the combination thereof in a carrier aggregation scenario with two cells, as well as the aggregated cumulative distribution function curve used for throughput threshold comparison and traffic congestion analysis, in accordance with an example implementation of the present disclosure.

FIG. 2a illustrates cumulative distribution function curves derived from network counters for each cell and the combination thereof in a carrier aggregation scenario with two cells, as well as the aggregated cumulative distribution function curve used for throughput threshold comparison and traffic congestion analysis, in accordance with an example implementation of the present disclosure.

Shown in FIG. 2a are CDF curves for expected throughputs computed according to the formulas described above. In particular, a first curve f1 is depicted for a first cell $C_i$ working on a first carrier frequency L1 (e.g., typically 800 MHz for LTE), a second curve f2 is depicted for a second cell $C_j$ working on a second carrier frequency L2 (e.g., typically 1800 MHz for LTE), a third curve f3 corresponds to carrier aggregation between both $C_i$ and $C_j$, and a fourth curve g, representing a aggregated curve obtained by weighting of the first three curves by applying the formula (7) and the weights w of the formulas (4) and (5).

By applying the formula (11) to the aggregated curve g, the low-end throughput may be obtained simply by detecting when a horizontal line corresponding to a CDF=0.1 value crosses this aggregated curve g. This point is materialized by a bold black bullet, yielding, according to the depicted example, a throughput of 9.33 Mbps. In order to interpret this value, it may be necessary to compare it with the predetermined minimal throughput level Tm, which is set, according to the particular illustrated example implementation, to 10 Mbps. Such a threshold value is considered to be reasonable for downloading data, and even for video streaming.

A congestion situation Cs can then be determined (e.g., being easily visualized) by comparing the obtained low-end throughput value with this minimal throughput level Tm: if Thr<Tm, then congestion is detected. Thus, as shown in FIG. 2a, congestion indeed occurs, because the yielded low-end throughput value of 9.33 Mbps is below the preset boundary of 10 Mbps.

According to other alternative implementations, the minimal throughput level Tm may be set to other threshold values, and the percentile also set to other ratios; it can be appreciated though that the lower the percentile value is chosen, together with the higher the value at which the minimal throughput level Tm is set, the better service quality is ensured.

As shown in the example illustrated in FIG. 2a, the other throughputs for all other CDF curves f1, f2, and f3, indicated by crosses instead of a bullet, read respectively 2.93 Mbps, 8.84 Mbps, and 18.09 Mbps for a CDF value of 0.1, but yet do not have any meaning corresponding to a statistical modelling of the reality, unlike the one of 9.33 Mbps of the aggregated curve g, which corresponds to a low-end service scenario; these throughput values merely indicate what low-end throughput could have been reached for each of the three possible cell connection configurations, described above, taken independently.

The detection of a congestion situation Cs, by comparing the yielded low-end throughput value (e.g., 9.33 Mbps, as indicated by the bold bullet point shown in FIG. 2a), with the minimal throughput level Tm, can be considered as the first congestion detection substep (B1) of the data analysis step (B) illustrated previously in FIG. 1. Such a congestion situation Cs happens when the computed bold bullet point finds itself in the dashed zone located left of a vertical line corresponding to the minimal throughput level Tm depicted in FIG. 2a. Depending on the difference between the obtained low-end throughput of the aggregated curve g and the minimal throughput level Tm, or a ratio between these two values, a congestion level can also be determined, which may be helpful to prioritize actions to take in a subsequent step, such as the prioritization step (E) illustrated in FIG. 1.

In the example illustrated in FIG. 2a, the throughput of 9.33 is close to 10 Mbps, so that the congestion level is not dramatic. Should, in contrast, a throughput of 5 Mbps be returned by the calculation according to the proposed scheme, the congestion level may be considered severe.

In accordance with an example implementation of the roll-out planning scheme described herein, the next substep of the data analysis step (B) is the pain point identification substep (B2), which is explained further in view of FIG. 2b and the following the formulas (12), (13) and (14) below.

Figure 2B:
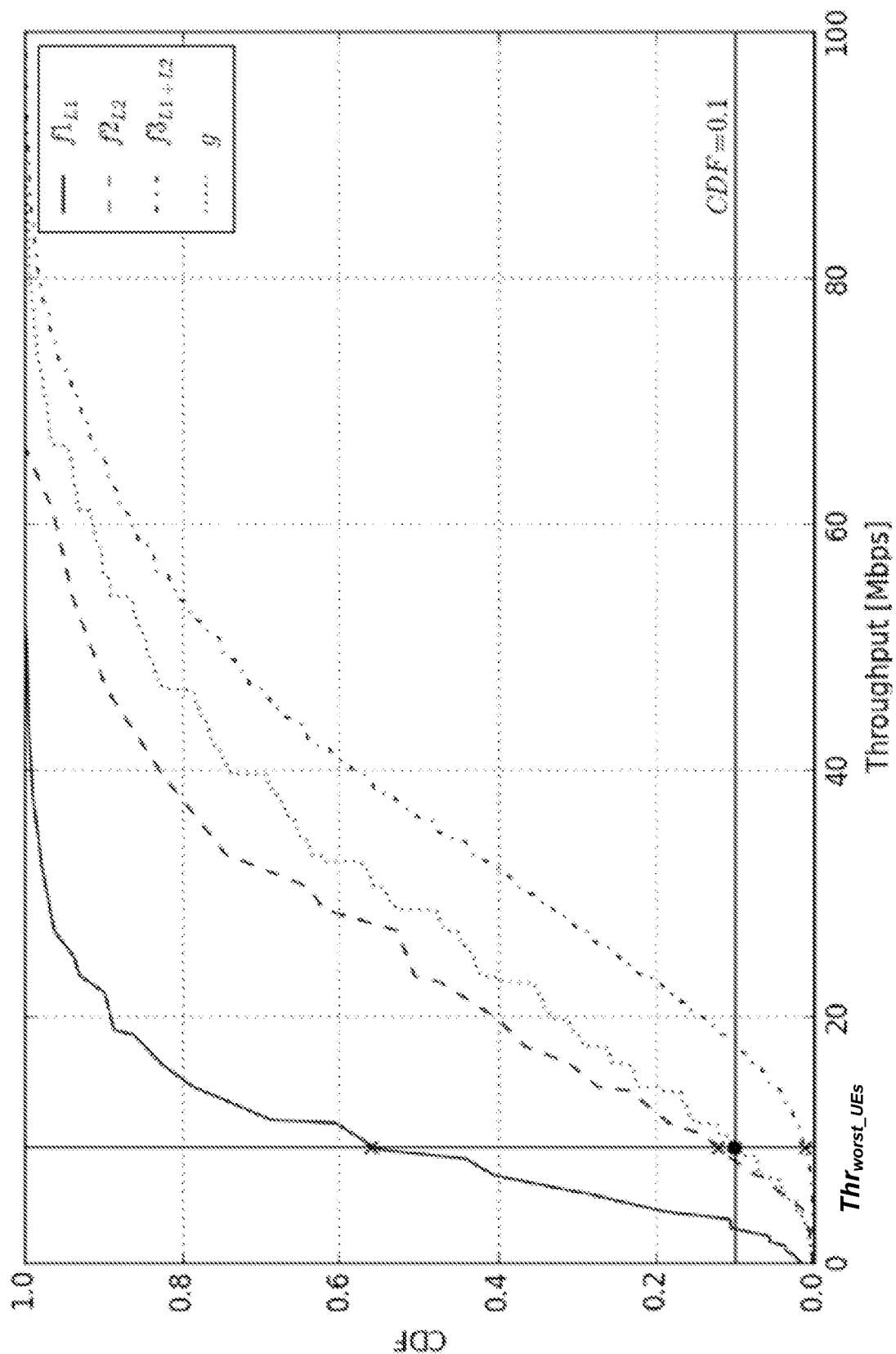
FIG. 2b illustrates the same cumulative distribution functions as on previous FIG. 2a, but now with an emphasis on the contribution of each cell for load-balancing analysis, in accordance with an example implementation of the present disclosure.

FIG. 2b illustrates the same cumulative distribution functions as on previous FIG. 2a, but now with an emphasis on the contribution of each cell for load-balancing analysis, in accordance with an example implementation of the present disclosure.

For example, the probability of 0.1 related to the $Thr_{worst\_UEs}$ is the sum of 3 contributions, one for each of the user configurations:

$$0.1 = \Sigma_{C \in \{C_i, C_j, C_i+C_j\}} contrib_C \quad (12)$$

where each contribution is defined as follows:

$$contrib_{C_i} = Pr(Conf=C_i)*CDF_{Thr,C_i}(Thr_{worst\_UEs})$$

$$contrib_{C_j} = Pr(Conf=C_j)*CDF_{Thr,C_j}(Thr_{worst\_UEs})$$

$$contrib_{C_i+C_j} = Pr(Conf=C_i+C_j)*CDF_{Thr,C_i+C_j}(Thr_{worst\_UEs}) \quad (13)$$

The bold bullet point of aggregated curve g having a CDF of 0.1, as shown in FIGS. 2a and FIG. 2b, is actually obtained by applying the weights w yielded by previous the formulas (4) and (5) to curves f1, f2, and f3. The crosses that are visible in FIG. 2b indicate the CDFs values that are used by the formula (13). Then, a ratio r of the contributions of the 2 cells is defined according to the formula (14) below:

$$r = \frac{contrib_{C_i}}{contrib_{C_j}} \quad (14)$$

The pain point PP is determined according to the formula (15) below:

if $r > b \rightarrow PP = C_i$ if $r < 1/b \rightarrow PP = C_j$ else $\rightarrow PP$=balanced  (15)

where the b parameter corresponds to a balancing ratio, here chosen to be equal to 1.25.

In other words, if the ratio of contribution of the two cells $C_i$ and $C_j$ is comprised within 0.8 to 1.25, e.g., close to 1, it is considered that both cells are equally affected by the congestion problem. Otherwise, it is possible to pinpoint which one of the two cells, $C_i$ and $C_j$, is most affected. In other words, the pain point identification substep (B2) possibly indicates whether the congestion problem is balanced between cells, and otherwise, indicates which cell is most concerned. Therefore, as an outcome of this pain point identification substep (B2), it may already be possible to focus, at this stage, on measures to be taken for specific cells of each sector analysed during the subsequent action recommendation step (D).

If a specific cell can be identified during the pain point identification substep (B2), then a further advantageous classification substep (B3) of the data analysis step (B) is proposed according to the example implementation described, in order to classify these pain points (PP) into subcategories, and further prune relevant technical options to solve the congestion issue to be considered during the subsequent action recommendation step (D).

In particular, if a paint point PP is not balanced and thus a given cell (e.g., cell $C_i$) is concerned, the pain point classification substep (B3) determines whether the issue detected pertains to coverage or capacity according to the formula (16) below:

if $Pr(bad_{coverage}, PP) > Pcov \rightarrow PP - cov$  (16)

else $\rightarrow PP - cap$ wherein the probability of a user in a cell to be indoor or at the cell edge is defined according to the formula (17) below:

$$Pr(bad\_coverage, C_i) = \frac{CA \text{ capable not configured } UEs(C_t)}{CA \text{ capable } UEs(C_i)} \quad (17)$$

In the formula (17) above, the probability of a bad coverage is estimated by measuring the ratio between the number of users that could have potentially used CA on the concerned cell, but actually did not because of their radio conditions. This ratio is compared, in the formula (16), with the Pcov boundary percentage (e.g., set to around 20%), in order to determine whether coverage (coy) or capacity (cap) is the most critical issue for the concerned pain point.

As a result, the paint point classification substep (B3) allows the labelling of the pain points (PP) as coverage or capacity problems by still involving carrier aggregation (CA) as a modelling parameter. The additional pruning of available technical options further simplifies the processing of the subsequent recommendation step (D).

In other example implementations, the input parameter b (balancing ratio) used in pain point identification substep (B2) and Pcov (boundary probability of a bad coverage) used in paint point classification substep (B3) could be adjusted to different levels, depending on how the filtering of the technical options is sought to be performed. The closer to 1 the balancing ratio b is set, the easier it becomes to pinpoint individual cells, and perform subsequent classification thereof; then, the higher the boundary probability of a bad coverage Pcov is set, the more the technical recommendations will be oriented toward capacity solving.

As mentioned above, despite the fact that the detailed example given for the data analysis step (B) further in view of FIGS. 2a and 2b involves 2 cells working on two carrier frequencies only, the disclosed scheme could also be extended to scenarios involving additional cells working on other respective carriers (e.g., with a third cell $C_k$ working on a third carrier frequency L3, such as typically 2100 MHz for LTE, and a fourth cell $C_l$ working on a fourth carrier frequency L4, such as typically 2600 MHz for LTE, and so on) using the same principles of CA.

For example, assuming that the multiplexing of a random number of carriers simultaneously is possible for a given technology supporting CA (e.g., also more than two at the same time), the possible cell connection configurations for a user in sector, having, for example, three cells using such a technology, would then be: (i) User connected to cell1 $C_i$; (ii) User connected to cell2 $C_j$; (iii) User connected to cell3 $C_k$; (iv) User connected to cell1+cell2 $C_i+C_j$; (v) User connected to cell1+cell3 $C_i+C_k$; (vi) User connected to cell2+cell3 $C_j+C_k$; and (vii) User connected to cell1+cell2+cell3 $C_i+C_j+C_k$.

The aggregated CDF curve may then be obtained by combining all of these CDFs with the corresponding weights of the probability of a configuration being one of these cell connection configurations (e.g., Pr(Conf=(i)–(vii))), by taking further inputs from additional network counters and adjusting the concerned the formulas (e.g., the formulas (4) and (5)). The congestion detection then may be similarly obtained by comparing whether the chosen percentile (e.g., 0.1) of the CDF aggregated curve is below the predefined minimal throughput level Tm (e.g., 10 Mbps).

Then, after having carried out this first congestion detection substep (B1), the trigger points for the pain point identification would be similarly set by calculating also the contributions of each cell as previously according to the formulas (12), (13), and (14). Then, instead of only one ratio r, two ratios are calculated, a first ratio between the contributions of cell1 and cell2 ($C_i$ and $C_j$), and a second ratio between the contributions of cell1 and cell3 ($C_i$ and $C_k$). Then, we use again the same thresholds 1.25 and 0.8 (e.g., by applying the same values of balancing ratio b) in order to identify the trigger point. The pain point (PP) configuration may be done as follows:

one cell only is identified: when one cell's contribution is higher than the other 2.

In this case, a subsequent classification substep (B3) can be further carried out in order to determine whether this identified cell is concerned primarily by a coverage or a capacity problem;

two cells are identified: when two cells' contributions are higher than the third but balanced between them; in that case, two further computations are performed to simplify the decision-making process; and a balanced situation when the contribution of all three cells is similar, in which case no further computation steps are undertaken.

The same principles and the formula adjustments would be made for a four-carrier scenario, or more, for which, during the data analysis step (B), the same sequence of substeps (B1, B2, B3) would apply, the pain point classification step (B3) remaining subordinated to the outcome of the previous pain point identification substep (B2).

In some example implementations, it would also be possible to consider, within the framework of the optimized roll-out planning in accordance with the present disclosure, subscription type of users in order to separate data flows and make distinct computations for each category of users. In this regard, mobile carriers may offer various levels of maximum data throughputs depending on a subscription type (e.g., maximum of 1 Mbps for a small package "S", 10 Mbps for a medium package "M", and 30 Mbps for a large package "L"). Hench, it may be unrealistic or even unfair to consider that all network resources should be equally distributed among all users, irrespective of their subscription category. Accordingly, roll-out planning may be configured to account for the various subscription types, such as by mapping subscription categories to various classes of services in order to provide a differentiated network resources allocation scheme depending on these categories.

For example, using LTE technology, voice-related traffic is always marked with QCI classes 1 and 5 irrespective of the QCI data class of the user. In the above example calculations, voice-related traffic was removed from the available resources of the carrier before calculating the data throughput curves; then, the remaining resources (e.g., the resources available for data traffic) were divided equally among the active users, independently from any QCI data class (as in the formula (1) described above). As a result, only one aggregated throughput curve was yielded per carrier.

This is illustrated in FIG. 1, which shows arrows labelled "S", "M", and "L" to indicate the possibility to separate data flows for each subscription type, by calculating one aggregated throughput distribution per QCI data class (e.g., class 9 mapped to subscription type "S", class 8 mapped to subscription type "M", and class 7 mapped to subscription type "L") so as to produce one low-end throughput value per each QCI data class. This way, the resources of the mobile carrier would be allocated to each QCI data class taking into consideration their priorities, making the provided statistical modelling for assessing expected throughput for a user in the sector even more realistic.

It may even be appreciated that such traffic modelling involving QoS class segmentation may be applied also for a single cell taken independently and not necessarily for a sector having multiple cells, since this QoS segmentation is not subordinated to the use of any CA technology. Such a modelling taking into account subscription types is further advantageous for additional reasons, such as, for example, it makes it possible to adjust also the minimal throughput level Tm depending on each data class in order to further fine-tune the roll-out planning.

Another advantage of considering subscription types when computing expected low-end throughputs is that it allows the calculations to be improved for growth prediction, and therefore also allows a better fine-tuning of the roll-out plan, especially concerning the timelines. In this regard, the number of users per subscription type may dramatically vary, so that a weighting according to the critical mass thereof may be highly relevant (e.g., usually the best sold subscription type is, by far, the medium "M") to extrapolate traffic growth predictions, on top of historical counter data that may be used to estimate trends—e.g., a linear growing rate of the number of active users at a rate X/week over a fixed time sliding window, such as the last 6 months or 12 months.

The prediction of future low-end throughput values in step (C) illustrated in FIG. 1 may also be based on predictions of future counter values (e.g., $c_1$ to $c_8$), while the prediction of future values of each counter is based on historical (past) values of that counter, from which a trend is derived. It is important to note that the analysis of historical values of counters can yield trends that are not necessarily linear: they could also be exponential, logarithmic, etc.

Moreover, historical values of a counter may include disruptions. Such disruptions can cause the estimation of the trend to be imprecise, or in extreme cases completely wrong. In this regard, there are two types of disruptions: temporary and permanent. Temporary disruptions are rare events that last for a limited period of time, during which the counter value may be exceptional and uncharacteristic. Examples of temporary disruptions include times corresponding to exceptional usage (e.g., Christmas to New Year's period, stretching over about two weeks; summer holidays, which usually spread over July and August) and/or events or conditions in the network that are of temporary nature (e.g., failure of a network element, which may lasting for a very limited period of time, such as an hour). In contrast, permanent disruptions are fundamental changes in the network configuration that happen at a point in time and remain in that new state. Examples of permanent disruptions include the deployment of a new network element in the area, or the opening of a new shopping mall.

Both of these types of disruptions in the historical counter values can negatively affect the prediction step (C). Therefore, in an example implementation, the prediction step (C) first detects, and then classifies, the disruption as being of one type or another, and then processes these disruptions in order to remove the effect thereof, thereby making the prediction results more precise.

In another example implementation, the processing of temporary disruptions may comprise having this type of disruption be partially or fully disregarded for prediction step (C). With partial disregarding, the data samples that are considered to be affected by the temporary disruption may be assigned a lower importance, and therefore weighted accordingly (e.g., by multiplying with a coefficient 0.2 instead of 1), while all the other samples having normal importance are not weighted. With full disregarding, data samples affected by the temporary disruption may be completely ignored, such as by setting the weighting coefficient to be equal to 0.

In an example embodiment, permanent disruptions are not disregarded, and further set time boundaries to historical data analysis. Indeed, when a permanent disruption is detected in the historical values of a counter, the time when the permanent disruption happened preferably sets the time window from the present to an anterior time limit until which the analysis can go backwards in time. Thus, the data analysis to estimate the trend of the counter may take into consideration only the samples after the last permanent disruption, and yet not the ones before that disruption.

As far as the growth prediction step (C) is concerned, not only QCI classes segmentation and the detection of disruptions may be useful, as explained in the above paragraphs, but also the use of network equipment configuration data to make traffic growth predictions more precise. In this regard, in view of the network equipment configuration data, it is possible to determine the last time when a major configuration change (e.g., new carrier in the sector, new sector in the area, change in transmission power, etc.) occurred, and look back only since that major change as a starting point for trend estimation, hence making the data much more precise. These equipment configuration data may be part of the further inputs, which may be obtained from other sources (e.g., other data sources 102 in FIG. 1, which may comprise network-generated and user-generated events traces) in addition to the network counters.

In other example implementations, other relevant inputs supplied by other sources (e.g., from other data sources 102 in FIG. 1) may be also leveraged in order to further optimize the roll-out planning process, on top of network equipment configuration data. In this regard, without event traces, all results calculated are related to the entire geographical area of a sector; hence, they do not make statements or draw any conclusions about any particular part of a sector, only the sector as a whole.

For example, using the user-generated events traces, which are events reported by each individual user, the results may be localized with a special focus on particular geographical areas within the sector, e.g., by application of trilateration algorithms. It would then be able to identify different types of hotspots as sub-pain points within the area of the sector, where additional small cells could be installed, for example.

Although the example implementation of the described roll-out planning optimization deals with a sector of an LTE cellular mobile network, a person with ordinary skill in the art will understand that such roll-out planning may also be applied to any mobile network technology supporting the carrier aggregation technique, such other cellular networks, other carrier frequencies, and/or other telecommunication solutions (e.g., IEEE standards like WLAN, WiMAX, etc.)

It will also be understood that the network counters used could be set to provide inputs other than daily rates, especially in order to adjust the network capacity to peak times (e.g., 15-minute or hourly rates may be most appropriate).

Also, it should be understood that instead of considering an achievable throughput of users present at a physical location, example implementations according to the present disclosure, which provide realistic throughput estimations and congestion detection assessment on a whole sector, in order to support roll-out planning, may also be applied to the calculation of a throughput for a new user entering this very same physical location without departing from the scope of the present disclosure. For example, minor changes may be made to the formulas (1) and (2) to account for how new users would likely be served in view of existing resources available for data traffic, instead of computing an average between all current users in the sector.

Other implementations of the disclosure may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein.

Accordingly, the present disclosure may be realized in hardware, software, or a combination of hardware and software. The present disclosure may be realized in a centralized fashion in at least one computer system, or in a distributed fashion where different units are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present disclosure may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present disclosure makes reference to certain implementations, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular implementation disclosed, but that the present disclosure will include all implementations falling within the scope of the appended claims.

| List of References and Acronyms | |
|---|---|
| A | Data gathering step |
| B | Data analysis step |
| B1 | Congestion detection substep |
| B2 | Pain point identification substep |
| B3 | Pain point classification substep |
| C | Growth prediction step |
| D | Action recommendation step |
| E | Prioritization step |
| F | Cost estimation step |
| b | Balancing ratio |
| c1 | $1^{st}$ network counter |
| c2 | $2^{nd}$ network counter |
| c3 | $3^{rd}$ network counter |
| c4 | $4^{th}$ network counter |
| c5 | $5^{th}$ network counter |
| c6 | $6^{th}$ network counter |
| c7 | $7^{th}$ network counter |
| Ci | Cell identifier |
| f1 | First curve corresponding to a first carrier frequency |
| f2 | Second curve corresponding to a second carrier frequency |
| f3 | Third curve corresponding to both first & second carrier frequencies |
| g | Aggregate curve |
| L1 | First carrier frequency |
| L2 | Second carrier frequency |
| L3 | Third carrier frequency |
| L4 | Fourth carrier frequency |
| L | "Large" subscription package |
| M | "Medium" subscription package |
| Tm | Throughput minimal level (preset by carrier) |

-continued

| List of References and Acronyms | |
|---|---|
| Cs | Congestion situation |
| Pe | Low percentile of PMF used for calculations |
| Pcov | Lower boundary for the probability of a bad coverage |
| q | CQI value |
| Rt | Block error rate |
| S | "Small" subscription package |
| w | Weighting parameter |
| 100 | Mobile Network |
| 101 | Roll-out plan |
| 102 | Other data sources besides network counters |
| CA | Carrier aggregation |
| Cap | Capacity |
| CDF | Cumulative distribution function |
| Cov | Coverage |
| CQI | Channel quality indicator |
| LTE | Long-term evolution (4G mobile technology standard) |
| PMF | Probability mass function |
| PP | Pain point |
| PRB | Physical resource block |
| QCI | Quality of Service (QoS) Class Identifier |
| RE | Resource element |
| Thr | Throughput |
| TTI | Transmission time interval |
| UE | User equipment |
| VoLTE | Voice over LTE |

What is claimed is:

1. A method for managing a network that comprises a plurality of cells, the method comprising:
    analyzing network data associated with the network, wherein the analyzing comprises assessing throughput of users on a sector-by-sector basis in the network;
    generating prioritization information on per-sector basis for the network; and
    optimizing, based on the prioritization information, a network roll-out plan for use in the network.

2. The method according to claim 1, wherein assessing the throughput of users comprises:
    determining available resources for one or more users in at least one cell;
    assess, based on the determined available resources, achievable data throughput for users present in a sector associated with the at least one cell; and
    setting a lower throughput boundary for worst-served users in the sector.

3. The method according to claim 2, further comprising determining the available network resources for data traffic, and based on at least one performance parameter associated with particular type of data traffic.

4. The method according to claim 1, wherein analyzing the network data comprises:
    applying congestion detection based on the network data;
    identifying based on the congestion detection one or more points of interest associated with one or more of the plurality of cells; and
    assessing the one or more points of interest.

5. The method according to claim 4, wherein applying the congestion detection comprises:
    assessing an aggregation scenario for a particular sector in the network, between two or more cells of the plurality of cells;
    detecting for the aggregation scenario, a congestion situation based on probabilities of one or more possible cell connection configurations in the sector, and a predefined minimal throughput level; and
    assessing achievable data throughput for users in the sector.

6. The method according to claim 5, wherein the sector further comprises at least three cells, and further comprising assessing the aggregation scenario based on support of multiplexing of a random number of carrier frequencies of the at least three cells.

7. The method according to claim 4, wherein applying the congestion detection comprises identifying based on the network data, one or more cells within a sector where congestion primarily occurs.

8. The method according to claim 7, wherein the identifying further comprises comparing at least one ratio of contribution between cells with a balancing ratio.

9. The method according to claim 7, further comprising, after identifying at least one cell within the sector, determining whether the identified at least one cell is primarily affected by a coverage or a capacity issue.

10. The method according to claim 9, further comprising:
computing a probability of a bad coverage;
comparing the calculated probability of a bad coverage with a predefined lower boundary probability; and
deriving a coverage or capacity issue labelling for the cell based on the comparing.

11. The method according to claim 1, further comprising computing different data profiles according to different user profiles, wherein each user profile corresponds to a subscription type and each subscription type is mapped onto a specific class of service.

12. The method according to claim 1, further comprising recommending one or more actions based on the network data.

13. The method according to claim 12, wherein the one or more actions comprise at least one of:
installing a new outdoor macro site in the area,
adding a new cell to the given sector,
expanding the bandwidth on a given cell,
adding antenna elements,
installing a new indoor small cell in the area,
installing a new outdoor small cell in the area, and
performing load-balancing adjustment between existing cells in the given sector.

14. The method according to claim 12, wherein recommending the one or more actions comprises generating a listing of technical options based on the network data.

15. The method according to claim 1, further comprising generating cost optimization information for use in the optimizing of the network roll-out plan.

16. The method according to claim 1, further comprising generating the prioritization information based on a valuation scheme and/or a congestion level.

17. The method according to claim 1, further comprising determining or adjusting the network roll-out plan based on network-generated and user-generated events traces in order to refine localization information where congestion occurs.

18. The method according to claim 17, further comprising refining localization information for where congestion occurs based on the network-generated and user-generated events traces.

19. The method according to claim 1, further comprising determining or adjusting the network roll-out plan based on network equipment configuration data.

20. The method according to claim 1, further comprising determining or adjusting the network roll-out plan based on historical network data associated with the network.

21. The method according to claim 20, further comprising detecting disruptions based on the historical network data.

22. The method according to claim 20, further comprising setting time windows for trend estimations based on disruptions classified as permanent.

23. The method according to claim 20, further comprising classifying the disruptions as temporary or permanent, wherein temporary disruptions are at least partially disregarded, and wherein permanent disruptions set time windows for trend estimations.

24. The method according to claim 23, further comprising partially or fully disregarding disruptions classified as temporary.

25. The method according to claim 1, further comprising determining available network resources for data traffic based on the network data.

* * * * *